March 2, 1971     R. R. SKRYCKI     3,567,234
GASKET CONSTRUCTION
Filed Sept. 3, 1969
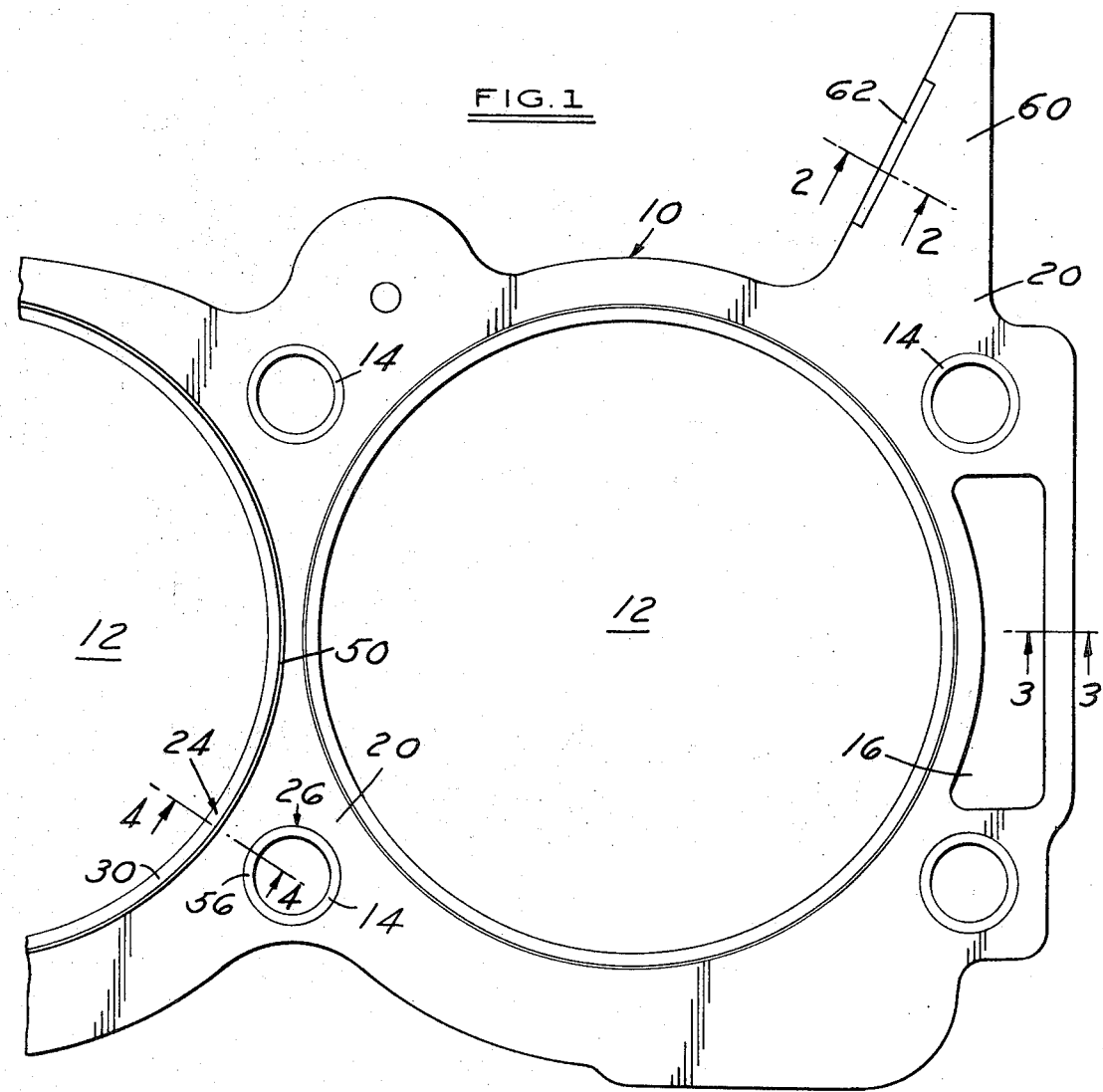
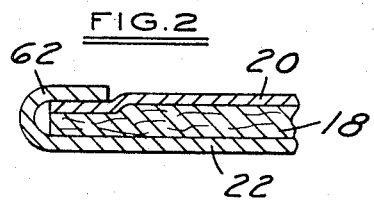
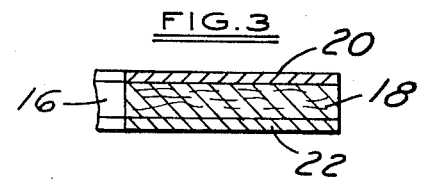
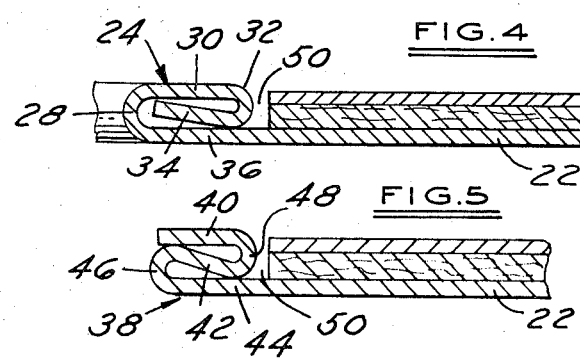
INVENTOR
ROBERT R. SKRYCKI
BY Barnes, Kisselle, Raisch & Choate.
ATTORNEYS

United States Patent Office 3,567,234
Patented Mar. 2, 1971

3,567,234
GASKET CONSTRUCTION
Robert R. Skrycki, Grosse Ile, Mich., assignor to
McCord Corporation, Detroit, Mich.
Filed Sept. 3, 1969, Ser. No. 854,957
Int. Cl. F02f 1/00
U.S. Cl. 277—235                 9 Claims

ABSTRACT OF THE DISCLOSURE

A gasket for use between the cylinder head and block of an engine having a core of compressible rubber-asbestos composition laminated between two thin metal sheets. The metal sheets are of slightly different thickness. Around the edge of the gasket openings registering with the cylinders in the block the thicker metal sheet is reversely bent upon itself to present a combusition seal flange of three metal thicknesses. Around the bolt openings in the gasket the thicker metal sheet is bent over the edge of the thinner metal sheet so that the compressed thickness thereof is slightly less than the compressed thickness of the gasket around the combustion sealing flanges for the cylinders.

---

This invention relates to a gasket construction and more particularly to a gasket designed for use between the cylinder head and block of an engine.

The prime function of any cylinder head gasket is to provide a seal between the cylinder head and block which will maintain its sealing ability against leakage of combustion gas pressure and water and oil fluid pressures throughout a wide range of temperatures and a wide range of static and dynamic loading conditions. Metal-clad head gaskets as conventionally constructed frequently fail to accomplish this objective because under normal operating temperatures and loads the compressible core tends to creep or relax from the sealing areas around the cylinder bores and from under the areas surrounding the cylinder head bolts. Such creeping or relaxing results in a loss of load at the cylinder head bolts and at the combustion seal around the cylinders and eventually accounts for combustion seal leaks and water and oil leaks.

The object of this invention is to provide a head gasket of the type having a compressible core clad on both sides with metal sheets which is designed so that, when the cylinder head bolts are tightened to a predetermined torque, retention of the seal around the cylinders and around the water and oil openings is assured.

Further objects and features of the present invention will become apparent from the following description and drawing, in which:

FIG. 1 is a fragmentary plan view of a gasket constructed in accordance with the present invention.

FIG. 2 is a sectional view of the gasket along the line 2—2 in FIG. 1.

FIG. 3 is a sectional view along the line 3—3 in FIG. 1.

FIG. 4 is a sectional view along the line 4—4 in FIG. 1.

FIG. 5 is a sectional view of a gasket according to the invention having a modified form of combustion seal.

Referring to the drawing, a composite gasket 10 is illustrated having cylinder openings 12 adapted to register with the cylinders in the block, bolt openings 14 adapted to register with the cylinder head bolts and water openings 16 adapted to register with water passageways in the head and block. Gasket 10 is of the laminated type consisting of a sheet of core material 18 clad on opposite sides thereof with metal sheets 20, 22. Core material 18 can be of any standard water and oil resistant compressible gasketing material, such as a conventional rubber-asbestos composition. Sheets 20, 22 can be formed of any conventional metal gasketing material, such as steel, stainless steel, copper, etc.

The periphery of each cylinder opening 12 is defined by a flange 24 and the periphery of each bolt opening 14 is defined by a flange 26. In the embodiment illustrated in FIG. 1 flange 24, which provides the combustion seal, is formed by bending bottom sheet 22 upwardly to form U bend 28 so that the top flange portion 30 extends parallel to the plane of the gasket. Flange 24 is formed with a second U bend 32 to locate the flange portion 34 intermediate the bottom flange portion 36 and the top flange portion 30. In the embodiment illustrated in FIG. 5 flange 38, which forms the combustion seal, is likewise formed from the bottom sheet 22 but the top, intermediate and lower flange portions 40, 42 and 44 are connected by the two U bends 46 and 48, respectively, so as to present a generally vertically flattened S configuration. In both embodiments illustrated in FIGS. 4 and 5, around the cylinder openings 12, top sheet 20 and the sheet of core material 18 terminate slightly radially outwardly from the outer periphery of flange 24 as indicated at 50.

As shown in FIG. 4, annular flange 26 around each bolt opening 14 is formed by bending bottom sheet 22 into a U as at 52 and over the slightly downwardly offset flange portion 54 of top sheet 20. Thus, annular flange 26 comprises upper and lower flange portions 56 and 58, respectively, which are formed from sheet 22 and the intermediate flange portion 54 which is formed from top sheet 20.

As shown in FIG. 3, the periphery of the water passageway opening 16 and the outer peripheral edge of the gasket are formed simply by blanking or shearing the top and bottom metal sheets 20, 22, respectively, and the sheet of core material 18. It will be apparent that there is no need to adhesively secure the top and bottom sheets 20, 22 to the sheet of core material 18. The individual sheets of the composite gasket are retained in assembled condition by the engagement of flange portion 54 around each bolt opening by top and bottom flange portions 56, 58 which are interconnected by U bend 52 and formed as part of the bottom sheet 22. In the event the gasket is formed with laterally extending leg portions such as indicated at 60 which terminate rather remotely from an adjacent bolt opening 14, bottom sheet 22 can be bent and flanged over top sheet 20 as indicated at 62 and, thus, prevent separation of the laminations at these portions of the gasket. This is done at locations where the gasket is not under a compression load between the cylinder head and block to avoid having the flanged thickness affect the load distribution on the gasket.

In the preferred construction of the gasket of this invention it is desired that the thickness of flange 24 forming the combustion seal around the cylinders be slightly greater than the fully compressed thickness of flange 26 around the bolt openings. This difference in the fully compressed thickness of these flanges produces very desirable advantages. When the gasket 10 is arranged between a cylinder head and block and the cylinder head bolts are tightened to the recommended torque, flanges 26 around the bolt openings are fully compressed so that flange portions 54, 56 and 58 are in tight face-to-face contact and cooperate to form a positive solid metal stop which limits the extent to which the head can be drawn down toward the upper face of the cylinder block. Such tightening of the cylinder read bolts naturally results in compression of the annular flanges 24 around the cylinder openings 12. However, since the fully compressed thickness of flanges 24 is slightly greater than the fully compressed thickness of flanges 26, it follows that the head is caused to deflect slightly and thus apply a positive load on the combustion seal. The magnitude of the defference in the fully compressed thickness of flanges 24, 26 is preferably only a few thousandths of an inch. For example, excellent results have been obtained when sheet 22 is formed from tin plated sheet steel having a thickness of .010" and sheet 20 is formed of similar material having a thickness of .007" so that the difference in the fully compressed thickness of flanges 24 and 26 was about .003". In the gasket referred to the sheet of core material 18 was formed from a rubber-asbestos composition having a thickness of .020". With this gasket construction there is always provided a positively loaded solid metal combustoin seal around cylinder openings 12 and also positively loaded solid metal mechanical stops around bolt openings 14.

It will be appreciated that, while a solid metal combustion seal is provided around the cylinder openings and solid metal mechanical stops are provided around the bolt openings 14.

It will be appreciated that, while a solid metal combustion seal is provided around the cylinder openings and solid metal mechanical stops are provided around the bolt openings, nevertheless the portions of the gasket spaced from these solid metal seals and solid metal mechanical stops are compressible and capable of conforcing to any surface irregularities between the cylinder head and block such as cight be caused by scratches, dirt and chips. This is particularly important, for example, around the water passageway openings 16. The ability of the portions of the gasket surrounding the opening 16 to conform to surface irregularities eliminates substantially the possibility of water leaks caused by such surface irregularities adjacent these openings in the mating faces of the cylinder block and head. This is also true of any oil holes which might be incorporated in the gasket.

The gasket construction disclosed herein has further desirable features. It minimizes the load loss at the bolts (commonly measured as torque loss) and at the combustion seals. This improvement results from the elimination or absence of compressible core material from the sealing areas around the cylinders and from the areas surrounding the cylinder head bolts. The gasket construction disclosed herein also results in a more uniform compressed thickness thus minimizing the cylinder bore and valve seat distortion in the cylinder head which normally results from excessive flexing of the cylinder head when the cylinder head bolts are tightened. It also results in improved structural resistance to thermal distortions of the head caused by overheating and thus eliminates the resultant over-compressing of the combustion seal and subsequent combustion leaks. The solid steel ring provided by flange 24 around the cylinder openings 12 provides an increased radial strength and a maximum blowout resistance for a compressed thickness. In this connection it will be observed that U bend 28 presents a vertically continuous sealing surface to the combustion gases in the cylinder. However, the construction of flange 38 shown in FIG. 5 is less costly than that shown at 24 in FIG. 4 from the standpoint of tooling involved.

I claim:

1. A gasket for use between a cylinder head and block of an engine comprising a sheet of compressible gasket core material clad on the opposite faces thereof with a thin sheet of metal to form a composite gasket, said composite gasket having a set of cylinder openings therein adapted to register with the cylinders of the engine and having a set of bolt openings therein adapted to register with the cylinder head bolts, the periphery of said openings being annularly flanged, said annular flange around the openings of one set being defined by three stacked thicknesses of one of said metal sheets extending generally parallel to the plane of the composite gasket and connected by two U bends, the other metal sheet and said sheet of core material terminating radially outwardly of said annular flange around the openings of said one set, the annular flanges around the openings of the other set of openings being defined by two thicknesses of one of said metal sheets connected by a U bend with a single thickness of the other sheet disposed therebetween, said sheet of core material terminating radially outwardly of said last-mentioned flanges.

2. A gasket as called for in claim 1 wherein the flange portions connected by the return bends around the openings of both sets are formed from the same metal sheet.

3. A gasket as called for in claim 1 wherein the flanges defined by three thicknesses of sheet metal connected by two U bends extend around the cylinder openings in the gasket.

4. A gasket as called for in claim 1 wherein one of said sheets is slightly thicker than the other of said sheets whereby, when said flanges are fully compressed between the cylinder head and block, the annular flanges around the cylinder openings are slightly thicker than the annular flanges around the bolt openings.

5. A gasket as called for in claim 1 wherein the annular flanges around the cylinder openings when fully compressed are at least slightly thicker than the fully compressed flanges around the bolt openings.

6. A gasket as called for in claim 1 wherein the flanges defined by the triple metal thickness connected by two U bends extend around the cylinder openings and the metal sheet from which said last-mentioned flanges are formed is slightly greater in thickness than said other metal sheet.

7. A gasket as called for in claim 1 wherein the composite gasket is provided with additional openings adapted to register with passageways in the head and block, said last-mentioned openings being defined by concentric and similarly sized openings in said two metal sheets and said sheet of core material.

8. A gasket as called for in claim 1 wherein each triple thickness flange connected by two U bends extends around a cylinder opening in the gasket, one of said last-mentioned bends defining the inner periphery of said last-mentioned flange and interconnecting the outer layers of said last-mentioned annular flange, the other U bend of said last-mentioned flange interconnecting the intermediate layer with an outer layer of the flange.

9. A gasket as called for in claim 1 wherein said triple thickness flange connected by two U bends is of vertically flattened S shape.

References Cited

UNITED STATES PATENTS

| 1,597,040 | 8/1926 | Bailey | 277—235(B) |
| 1,779,616 | 10/1930 | Ouen | 277—235 |
| 1,846,402 | 2/1932 | Ouen | 277—235 |
| 1,928,116 | 9/1933 | Stephens | 277—235 |

WILLIAM F. O'DEA, Primary Examiner

R. I. SMITH, Assistant Examiner

UNITED STATES PATENT OFFICE
CERTIFICATE OF CORRECTION

Patent No. 3,567,234        Dated March 2, 1971

Inventor(s) Robert R. Skrycki

It is certified that error appears in the above-identified patent and that said Letters Patent are hereby corrected as shown below:

Column 2, line 67, after "bolts" insert --are tightened to the recommended to flanges 26 around the bolt openings are fully compressed s that flange portions 54, 56 and 58 are in tight face-to-fa contact and cooperate to form a positive solid metal stop which limits the extent to which the head can be drawn dow toward the upper face of the cylinder block. Such tighten of the cylinder head bolts--.

Column 3, line 1, "defference" should be --difference- line 2, "thickness" should be --thicknesses--; line 13, "combustoin" should be --combustion--; line 25, "conforcin should be --conforming--; line 27, "cight" should be --mig line 15, after --bold openings 14.-- delete "It will be appreciated that, while a solid metal combustion seal is p vided around the cylinder openings and solid metal mechani stops are provided around the bolt openings 14."

Signed and sealed this 15th day of February 1972.

(SEAL)
Attest:

EDWARD M. FLETCHER, JR.
Attesting Officer

ROBERT GOTTSCHALK
Commissioner of Patents